(12) United States Patent
Ishikawa et al.

(10) Patent No.: US 11,971,265 B2
(45) Date of Patent: Apr. 30, 2024

(54) MONITORING DEVICE, MONITORING METHOD, AND MONITORING SYSTEM

(71) Applicant: TOYOTA JIDOSHA KABUSHIKI KAISHA, Toyota (JP)

(72) Inventors: Marie Ishikawa, Nagoya (JP); Aya Hamajima, Nagoya (JP); Daichi Hotta, Tokyo (JP); Hayato Ito, Susono (JP); Hidekazu Sasaki, Yokohama (JP); Yasuhiro Kobatake, Nagoya (JP); Akihiro Kusumoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 17/682,445

(22) Filed: Feb. 28, 2022

(65) Prior Publication Data

US 2022/0316893 A1    Oct. 6, 2022

(30) Foreign Application Priority Data

Apr. 1, 2021    (JP) .................................. 2021-062781

(51) Int. Cl.
  *G01C 21/34* (2006.01)
  *B60W 50/10* (2012.01)

(52) U.S. Cl.
  CPC ......... *G01C 21/3461* (2013.01); *B60W 50/10* (2013.01); *G01C 21/3438* (2013.01); *G01C 21/3492* (2013.01); *B60W 2420/403* (2013.01); *B60W 2554/4049* (2020.02)

(58) Field of Classification Search
  CPC .............. B60W 50/10; G01C 21/3461; G01C 21/3438; G06N 3/3492
  See application file for complete search history.

(56) References Cited

U.S. PATENT DOCUMENTS

| | | | |
|---|---|---|---|
| 2008/0165252 A1* | 7/2008 | Kamimura | H04N 7/181 348/155 |
| 2009/0273674 A1* | 11/2009 | Russ | B60R 1/00 348/148 |
| 2019/0366927 A1* | 12/2019 | Sakakura | H04N 23/60 |
| 2020/0086786 A1* | 3/2020 | Mackey | B60Q 1/1423 |
| 2020/0195893 A1 | 6/2020 | Obara et al. | |
| 2020/0394709 A1* | 12/2020 | Cella | G06Q 50/188 |

FOREIGN PATENT DOCUMENTS

| | | |
|---|---|---|
| CN | 111326007 A | 6/2020 |
| JP | 2003-198905 A | 7/2003 |
| JP | 2008-160496 A | 7/2008 |
| JP | 2009-169898 A | 7/2009 |
| JP | 2009-271612 A | 11/2009 |
| JP | 2018-190198 A | 11/2018 |
| WO | 2013/111479 A1 | 8/2013 |

* cited by examiner

*Primary Examiner* — Seth A Silverman
(74) *Attorney, Agent, or Firm* — Dinsmore & Shohl LLP

(57) ABSTRACT

A monitoring device includes: an instruction unit configured to instruct a vehicle to acquire appearance data of a monitoring object designated by a user; a detection unit configured to receive the appearance data from the vehicle and to detect whether a state of the monitoring object has changed based on the appearance data; and a monitoring result notifying unit configured to notify the user of a monitoring result of the monitoring object when the detection unit detects that the state of the monitoring object has changed.

13 Claims, 8 Drawing Sheets

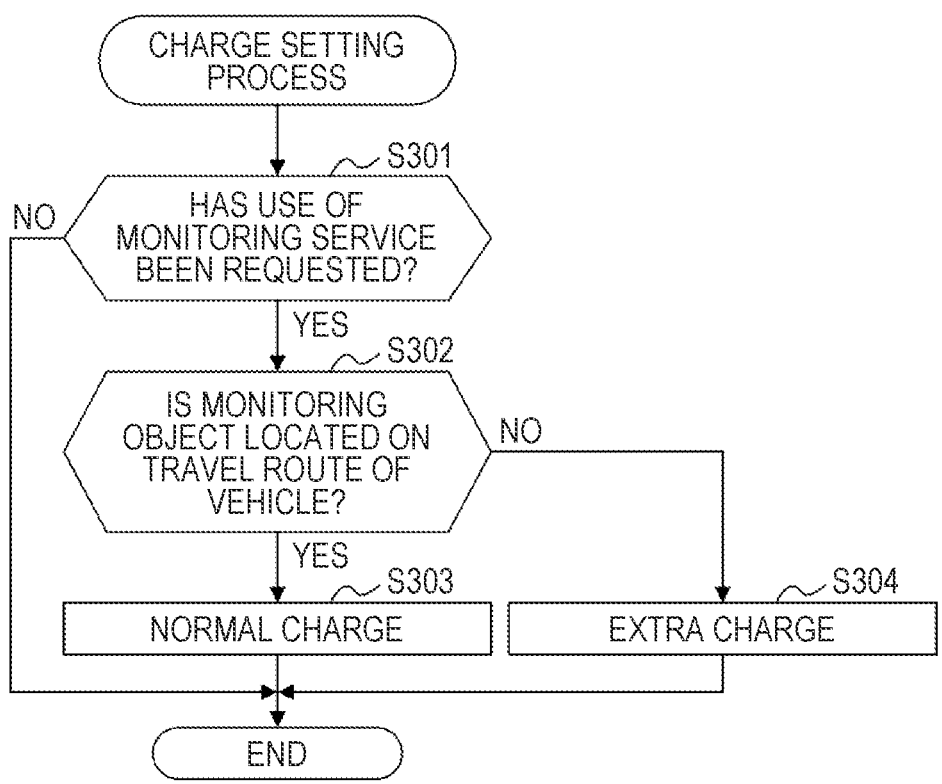

MONITORING DEVICE, MONITORING METHOD, AND MONITORING SYSTEM

CROSS-REFERENCE TO RELATED APPLICATION

This application claims priority to Japanese Patent Application No. 2021-062781 filed on Apr. 1, 2021, incorporated herein by reference in its entirety.

BACKGROUND

1. Technical Field

The disclosure relates to a monitoring device, a monitoring method, and a monitoring system.

2. Description of Related Art

In the related art, a technique of acquiring an image at a desired imaging position using an imaging device mounted in a vehicle in accordance with a user's request and providing the acquired image to the user is known (for example, see Japanese Unexamined Patent Application Publication No. 2003-198905 (JP 2003-198905 A)).

SUMMARY

In the technique disclosed in JP 2003-198905 A, sporadic acquisition of an image is supposed, but a desired monitoring object can also be continuously monitored using a vehicle. In this case, when appearance data of a monitoring object is acquired by a vehicle and a user is notified of a monitoring result at that time, the user needs to ascertain the monitoring result at that time and thus the user may feel annoyed.

Therefore, the disclosure provides a technique capable of enhancing convenience for a user when a monitoring service using a vehicle is provided.

The disclosure can be summarized as follows.

(1) According to an aspect of the disclosure, there is provided a monitoring device including: an instruction unit configured to instruct a vehicle to acquire appearance data of a monitoring object designated by a user; a detection unit configured to receive the appearance data from the vehicle and to detect whether a state of the monitoring object has changed based on the appearance data; and a monitoring result notifying unit configured to notify the user of a monitoring result of the monitoring object when the detection unit detects that the state of the monitoring object has changed.

(2) In the monitoring device according to (1), the monitoring result notifying unit may be configured to notify the user that the state of the monitoring object has changed when the detection unit detects that the state of the monitoring object has changed.

(3) In the monitoring device according to (1), the detection unit may be configured to detect whether the monitoring object has an abnormality based on the appearance data, and the monitoring result notifying unit may be configured to notify the user of the monitoring result of the monitoring object when the detection unit detects that the monitoring object has an abnormality.

(4) In the monitoring device according to (3), the monitoring result notifying unit may be configured to notify the user that an abnormality of the monitoring object has occurred when the detection unit detects that the monitoring object has an abnormality.

(5) In the monitoring device according to any one of (1) to (4), the appearance data of the monitoring object may include a captured image of the monitoring object.

(6) In the monitoring device according to (5), the monitoring result notifying unit may be configured to notify the user of the monitoring result by transmitting the captured image of the monitoring object to the user when the detection unit detects that the state of the monitoring object has changed.

(7) In the monitoring device according to (5) or (6), the monitoring result notifying unit may be configured to transmit the captured image of the monitoring object to the user in response to a request from the user.

(8) In the monitoring device according to any one of (5) to (7), the monitoring result notifying unit may be configured to transmit the captured image of the monitoring object to the user when disaster information of an area in which the monitoring object is situated is acquired.

(9) In the monitoring device according to any one of (1) to (8), the vehicle may be a regular-route bus of which a travel route is determined in advance and the monitoring object may be located on the travel route.

(10) The monitoring device according to any one of (1) to (8) may further include a payment unit configured to determine a charge for monitoring the monitoring object, the vehicle may be a regular-route bus of which a travel route is determined in advance, and the payment unit may be configured to set the charge for use to be higher when the monitoring object is not located on the travel route than when the monitoring object is located on the travel route.

(11) According to another aspect of the disclosure, there is provided a monitoring method including: instructing a vehicle to acquire appearance data of a monitoring object designated by a user; receiving the appearance data from the vehicle and detecting whether a state of the monitoring object has changed based on the appearance data; and notifying the user of a monitoring result of the monitoring object when it is detected that the state of the monitoring object has changed.

(12) According to another aspect of the disclosure, there is provided a monitoring system including a vehicle and a server, wherein the vehicle includes a surrounding information detecting device configured to detect surrounding information of the vehicle, and the server includes: an instruction unit configured to instruct the vehicle to acquire appearance data of a monitoring object designated by a user; a detection unit configured to receive the appearance data from the vehicle and to detect when a state of the monitoring object has changed based on the appearance data; and a monitoring result notifying unit configured to notify the user of a monitoring result of the monitoring object when the detection unit detects that the state of the monitoring object has changed.

According to the disclosure, it is possible to enhance convenience for a user when a monitoring service using a vehicle is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a flowchart illustrating a control routine of a charge setting process according to a third embodiment of the disclosure.

DETAILED DESCRIPTION OF EMBODIMENTS

Hereinafter, embodiments of the disclosure will be described with reference to the accompanying drawings. In the following description, the same elements will be referred to by the same reference signs.

First Embodiment

First, a first embodiment of the disclosure will be described below with reference to FIGS. 1 to 7.

Figure 1:
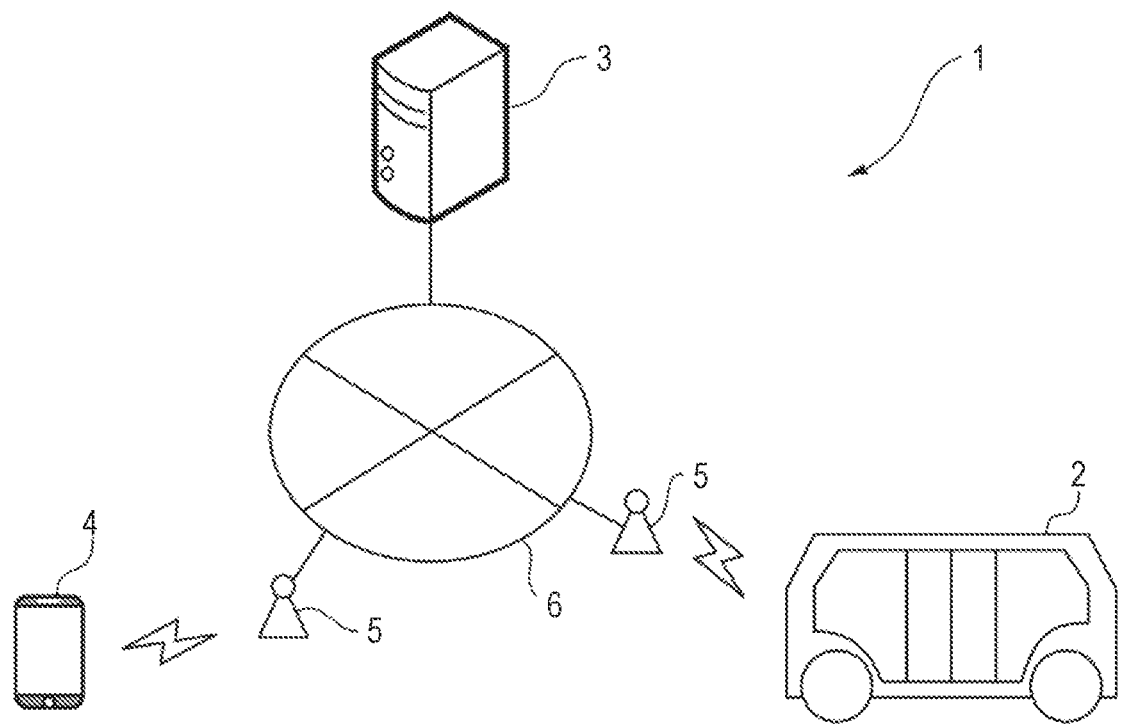
FIG. 1 is a diagram schematically illustrating a configuration of a monitoring system according to a first embodiment of the disclosure.

FIG. 1 is a diagram schematically illustrating a configuration of a monitoring system 1 according to the first embodiment of the disclosure. As illustrated in FIG. 1, the monitoring system 1 includes at least one vehicle 2 and a server 3. The monitoring system 1 provides a monitoring service using a vehicle 2 according to a user's input to a user terminal 4. The vehicle 2 and the user terminal 4 can communicate with the server 3 via a radio base station 5 and a communication network 6. The vehicle 2 and the user terminal 4 may be directly connected to the communication network 6 without using the radio base station 5.

The user terminal 4 is, for example, a smartphone, a tablet terminal, or a personal computer and is operated by a user. The user terminal 4 includes an input unit such as operation buttons or a touch panel and an output unit such as a display. An application for a monitoring service is installed in the user terminal 4, and the user performs an operation associated with the monitoring service over the application.

A vehicle 2 which is used for a monitoring service is configured to travel autonomously. That is, in the vehicle 2, all of acceleration, steering, and deceleration (braking) of the vehicle 2 are automatically controlled and a driver who drives the vehicle 2 is not necessary. Autonomous traveling is also referred to as automated driving, and the vehicle 2 is a so-called automated-driving vehicle. By using an automated-driving vehicle for a monitoring service as in this embodiment, it is possible to provide a monitoring service without requiring a driver.

A plurality of seats is provided in the vehicle 2, and the vehicle 2 can transport a plurality of passengers by autonomous traveling. In this embodiment, the vehicle 2 is a regular-route bus in which a travel route of the vehicle 2 is determined in advance. That is, the vehicle 2 stops at each bus stop on the travel route for boarding and alighting of passengers. It is possible to effectively utilize the vehicle 2 by providing the monitoring service using a regular-route bus providing a passenger transportation service.

Figure 2:
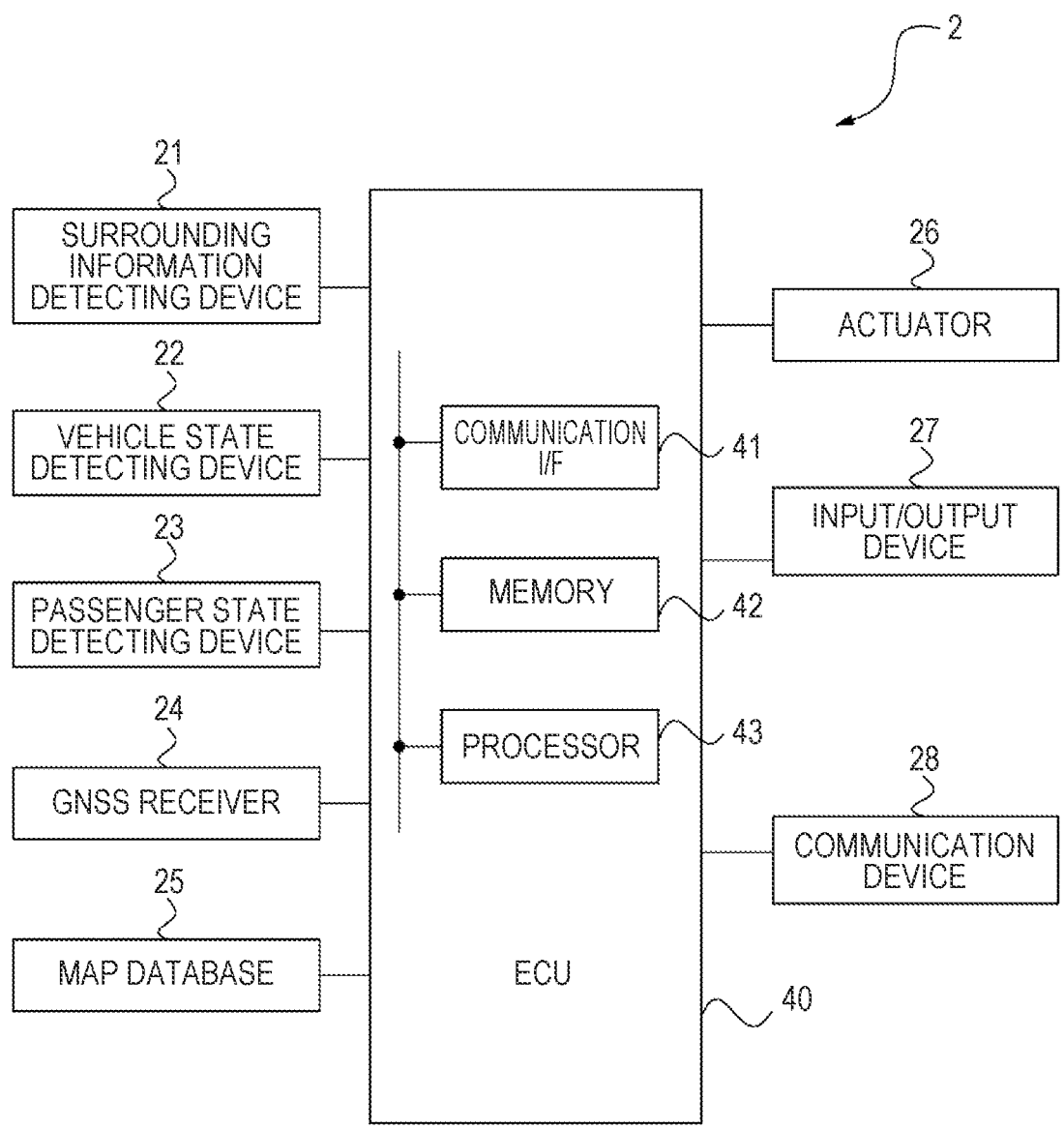
FIG. 2 is a diagram schematically illustrating a configuration of a vehicle.

FIG. 2 is a diagram schematically illustrating a configuration of the vehicle 2. As illustrated in FIG. 2, the vehicle 2 includes a surrounding information detecting device 21, a vehicle state detecting device 22, a passenger state detecting device 23, a global navigation satellite system (GNSS) receiver 24, a map database 25, an actuator 26, an input/output device 27, a communication device 28, and an electronic control unit (ECU) 40.

The surrounding information detecting device 21 detects surrounding information of the vehicle 2. The surrounding information includes information of white lines of a road, other vehicles, pedestrians, bicycles, buildings, signs, traffic signals, obstacles, and the like. The surrounding information detecting device 21 is electrically connected to the ECU 40 and the output of the surrounding information detecting device 21, that is, the surrounding information of the vehicle 2 detected by the surrounding information detecting device 21, is transmitted to the ECU 40.

Figure 3:
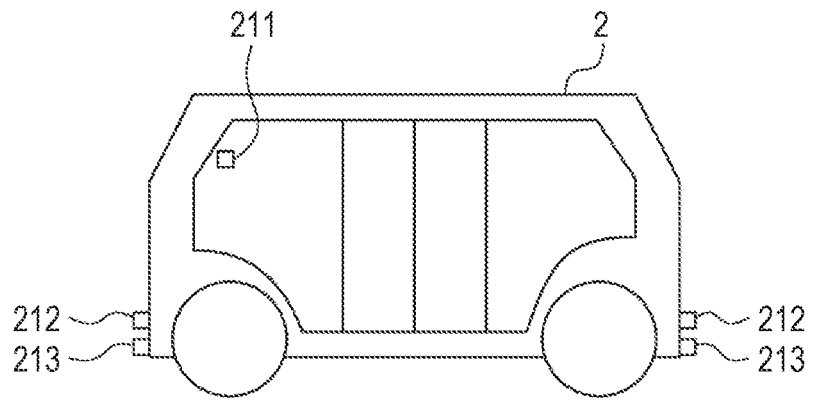
FIG. 3 is a diagram illustrating a specific example of a surrounding information detecting device.

FIG. 3 is a diagram illustrating a specific example of the surrounding information detecting device 21. In the example illustrated in FIG. 3, an outside camera 211, a LiDAR 212, and a millimeter-wave radar 213 are provided as the surrounding information detecting device 21 in the vehicle 2.

The outside camera 211 images the surroundings of the vehicle 2 and generates a surrounding image of the vehicle 2. For example, the outside camera 211 may be disposed in the front of the vehicle 2 (for example, on a rear surface of a rearview mirror in the cabin or a front bumper) such that a forward view from the vehicle 2 is imaged. The outside camera 211 may be a stereo camera that can measure a distance. An imaging direction of the outside camera 211 may be able to be adjusted.

The LiDAR 212 emits laser light to the surroundings of the vehicle 2 and receives reflected light of the laser light. Accordingly, the LiDAR 212 generates point group data indicating a local object near the vehicle 2. For example, the LiDARs 212 may be disposed in the front and the rear of the vehicle 2 (for example, on a front bumper and a rear bumper of the vehicle 2).

The millimeter-wave radar 213 emits millimeter waves to the surroundings of the vehicle 2 and receives reflected waves of the millimeter waves. Accordingly, the millimeter-wave radar 213 generates point group data indicating a local object near the vehicle 2. For example, the millimeter-wave radar 213 is disposed in the front and the rear of the vehicle 2 (for example, the front bumper and the rear bumper of the vehicle 2).

The positions and the numbers of the outside camera 211, the LiDAR 212, and the millimeter-wave radar 213 are not limited to the above description. Some of them may be omitted.

The vehicle state detecting device 22 detects state quantities of the vehicle 2. The state quantities of the vehicle 2 include a speed (vehicle speed), an acceleration, a steering angle, and a yaw rate of the vehicle 2. The vehicle state detecting device 22 includes, for example, a vehicle speed sensor, an acceleration sensor, a steering angle sensor, and a yaw rate sensor. The vehicle state detecting device 22 is electrically connected to the ECU 40 and the output of the vehicle state detecting device 22, that is, the state quantities of the vehicle 2 detected by the vehicle state detecting device 22, is transmitted to the ECU 40.

The passenger state detecting device 23 detects a passenger state of the vehicle 2. The passenger state detecting device 23 includes, for example, an inside camera that generates an image of a passenger, a seat belt sensor that detects whether a seat belt is being worn, a seat sensor that detects whether a passenger has sat on a seat, and a motion sensor that detects boarding and alighting of a passenger. The passenger state detecting device 23 is electrically connected to the ECU 40 and the output of the passenger state detecting device 23, that is, the passenger state of the vehicle 2 detected by the passenger state detecting device 23, is transmitted to the ECU 40.

The GNSS receiver 24 detects a current location of the vehicle 2 (for example, the latitude and longitude of the vehicle 2) based on positioning information acquired from a plurality of (for example, three or more) positioning satellites. Specifically, the GNSS receiver 24 performs capturing from a plurality of positioning satellites and receives radio waves emitted from the positioning satellites. Then, the GNSS receiver 24 calculates distances to the positioning satellites based on a difference between an emission time and a reception time of radio waves and detects the current location of the vehicle 2 based on the distances to the positioning satellites and the positions (orbit information) of the positioning satellites. The GNSS receiver 24 is electrically connected to the ECU 40 and the output of the GNSS receiver 24, that is, the current location of the vehicle 2 detected by the GNSS receiver 24, is transmitted to the ECU 40.

GNSS is a generic term for satellite positioning systems such as GPS of U.S.A., GLONASS of Russia, Galileo of Europe, QZSS of Japan, BeiDou of China, and IRNSS of India. Accordingly, the GNSS receiver 24 includes a GPS receiver.

The map database 25 stores three-dimensional map information such as road surface information, lane information, and position information of buildings. A map stored in the map database 25 is a so-called high-precision map. The map database 25 is electrically connected to the ECU 40, and the ECU 40 acquires map information from the map database 25. The map information stored in the map database 25 may be periodically updated using communication with the outside of the vehicle 2, a simultaneous localization and mapping (SLAM) technique, or the like. The map database may be provided outside of the vehicle 2 (for example, in a server 3) and the ECU 40 may acquire the map information from the outside of the vehicle 2.

The actuator 26 enables the vehicle 2 to operate. For example, the actuator 26 includes a drive device that accelerates the vehicle 2 (at least one of an engine and a motor), a brake actuator that decelerates (brakes) the vehicle 2, a steering motor that steers the vehicle 2, and a door actuator that opens and closes a door of the vehicle 2. The actuator 26 is electrically connected to the ECU 40, and the ECU 40 controls the actuator 26 such that the vehicle 2 travels autonomously.

The input/output device 27 performs input and output of information between the vehicle 2 and a passenger. The input/output device 27 includes, for example, a display that displays information, a speaker that generates sound, operation buttons or operation switches that are used for a passenger to perform an input operation, and a microphone that receives vocal sound of a passenger. The input/output device 27 is electrically connected to the ECU 40. Accordingly, the output of the ECU 40 is delivered to a driver via the input/output device 27, and an input from the driver is transmitted to the ECU 40 via the input/output device 27.

The input/output device 27 is also referred to as a human-machine interface (HMI). A mobile terminal (for example, a smartphone or a tablet terminal) of a passenger may be connected to the ECU 40 via an onboard network of the vehicle 2 in a wireless or wired manner and serve as an input/output device.

The communication device 28 is a device (for example, a data communication module (DCM)) that enables communication between the vehicle 2 and the outside of the vehicle 2. The communication device 28 is connected to the communication network 6 via a radio base station 5 by accessing the radio base station 5. The communication device 28 is electrically connected to the ECU 40, and the ECU 40 communicates with the server 3 via the communication device 28, the radio base station 5, and the communication network 6.

The ECU 40 performs various types of control of the vehicle 2. As illustrated in FIG. 2, the ECU 40 includes a communication interface 41, a memory 42, and a processor 43. The communication interface 41 and the memory 42 are connected to the processor 43 via signal lines. In this embodiment, a single ECU 40 is provided, but a plurality of ECUs may be provided to individually correspond to the functions.

The communication interface 41 includes an interface circuit that is used to connect the ECU 40 to an onboard network based on a standard such as controller area network (CAN). The ECU 40 communicates with an onboard device (such as another ECU) connected to the onboard network via the communication interface 41 and the onboard network. The communication interface 41 is an example of a communication unit of the ECU 40.

The memory 42 includes, for example, a volatile semiconductor memory (for example, a RAM)) and a nonvolatile semiconductor memory (for example, a ROM). The memory 42 stores computer programs which are executed by the processor 43, various types of data which are used for the processor 43 to perform various processes, and the like. The memory 42 is an example of a storage unit of the ECU 40.

The processor 43 includes one or more central processing units (CPUs) and peripheral circuits thereof and performs various processes. The processor 43 may further include another operation circuit such as a logical operation unit, a numerical operation unit, or a graphic processing unit. The processor 43 is an example of a control unit of the ECU 40.

Figure 4:
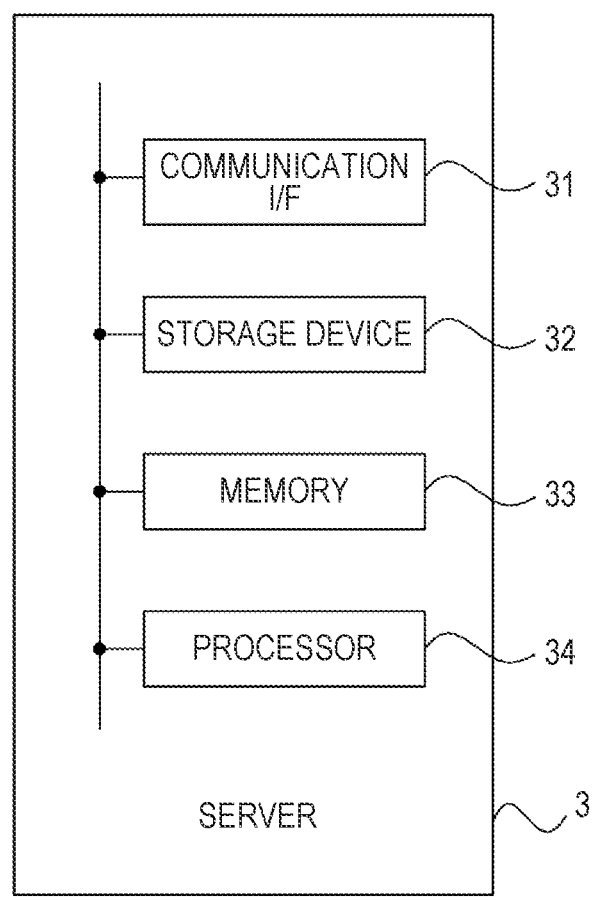
FIG. 4 is a diagram schematically illustrating a configuration of a server illustrated in FIG. 1.

FIG. 4 is a diagram schematically illustrating a configuration of the server 3. The server 3 includes a communication interface 31, a storage device 32, a memory 33, and a processor 34. The communication interface 31, the storage device 32, and the memory 33 are connected to the processor 34 via signal lines. The server 3 may further include an input device such as a keyboard and a mouse and an output device such as a display. The server 3 may include a plurality of computers. The server 3 is an example of a monitoring device.

The communication interface 31 includes an interface circuit that is used to connect the server 3 to the communication network 6 and enables communication between the server 3 and the vehicle 2. The server 3 communicates with the vehicle 2 via the communication network 6 and the radio base station 5. The communication interface 31 is an example of a communication unit of the server 3.

The storage device 32 includes, for example, a hard disk drive (HDD), a solid-state drive (SSD), or an optical recording medium and an access device thereof. The storage device 32 stores various types of data and stores, for example, information transmitted from the vehicle 2, map information, computer programs that are used for the processor 34 to perform various processes, and the like. The storage device 32 is an example of a storage unit of the server 3.

The memory 33 includes a nonvolatile semiconductor memory (for example, a RAM). For example, the memory 33 temporarily stores various types of data which are used for the processor 34 to perform various processes. The memory 33 is an example of the storage unit of the server 3.

The processor 34 includes one or more CPUs and peripheral circuits thereof and performs various processes. The processor 34 may further include another operation circuit such as a logical operation unit, a numerical operation unit, or a graphics processing unit.

Figure 5:
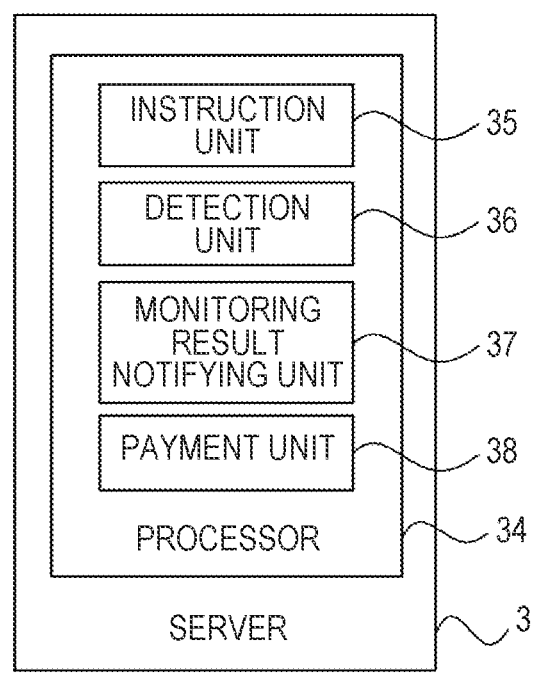
FIG. 5 is a functional block diagram of a processor of the server.

FIG. 5 is a functional block diagram of the processor 34 of the server 3. In this embodiment, the processor 34 includes an instruction unit 35, a detection unit 36, a monitoring result notifying unit 37, and a payment unit 38. The instruction unit 35, the detection unit 36, the monitoring result notifying unit 37, and the payment unit 38 are functional modules which are realized by causing the processor 34 of the server 3 to execute computer programs stored in the storage device 32 of the server 3. These functional modules may be realized by a dedicated operation circuit provided in the processor 43. The functional modules may be realized by processors of a plurality of servers that can communicate with each other. That is, a plurality of servers may serve as a monitoring device.

The instruction unit 35, the detection unit 36, the monitoring result notifying unit 37, and the payment unit 38 perform the following processes associated with a monitoring service. The instruction unit 35 instructs the vehicle 2 to acquire appearance data of a monitoring object designated by a user in response to a request from the user. The detection unit 36 receives appearance data from the vehicle 2 and detects whether a state of the monitoring object has changed based on the appearance data.

When a change in state of the monitoring object has been detected by the detection unit 36, the monitoring result notifying unit 37 notifies the user of a monitoring result of the monitoring object. Accordingly, notification of the monitoring result to the user when the vehicle 2 acquires appearance data is avoided at that time, and the user is notified of the monitoring result only when there is high necessity for ascertainment of the monitoring result. Accordingly, it is possible to reduce labor of the user for ascertaining the monitoring result and to enhance convenience for the user.

The payment unit 38 performs a payment process for the monitoring service when the monitoring service is provided to the user. For example, the payment unit 38 makes a predetermined charge for use of the monitoring service to the user when the monitoring service is provided to the user.

Figure 6:
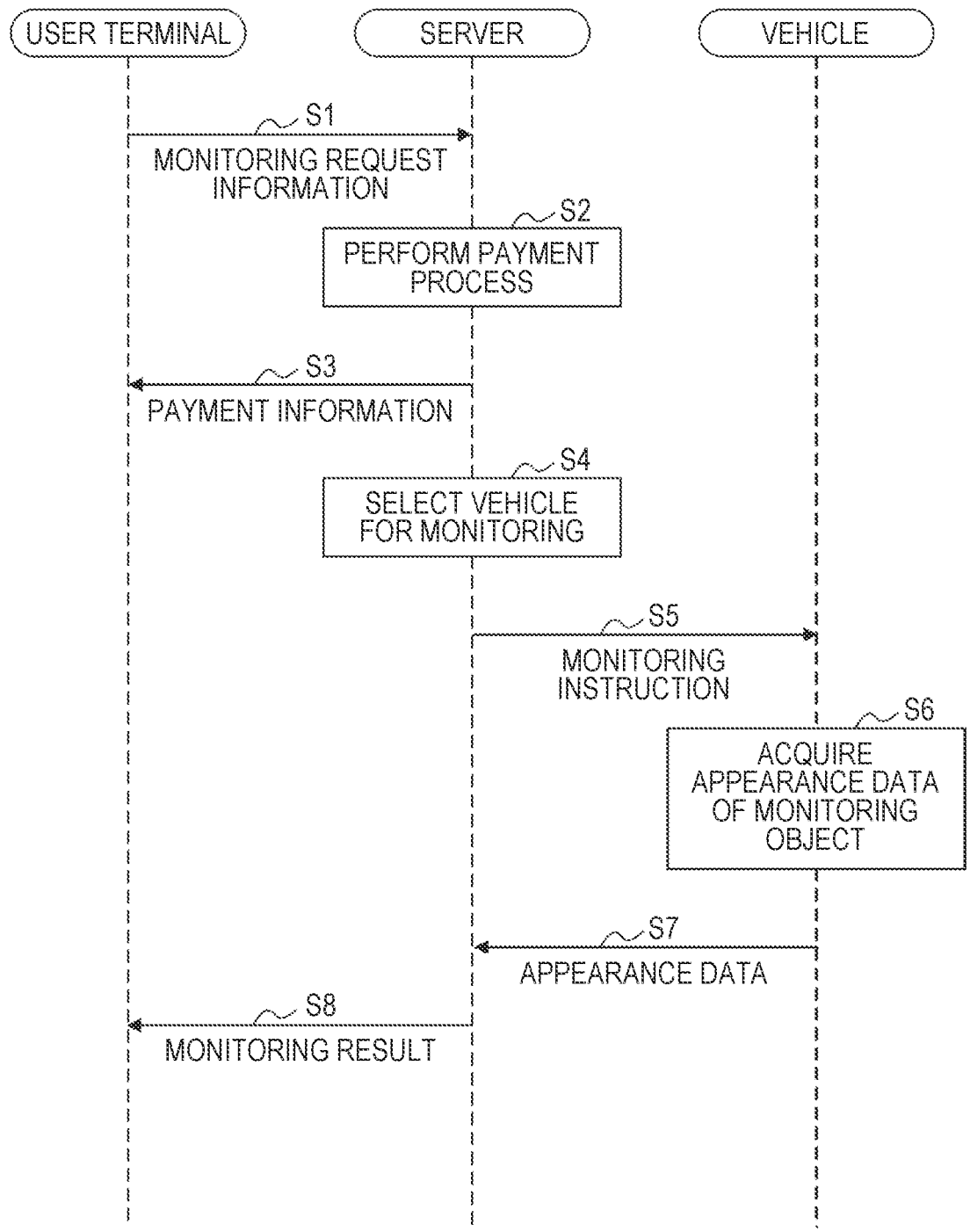
FIG. 6 is a sequence diagram illustrating an example of a routine which is performed by the monitoring system when a monitoring service is provided.

FIG. 6 is a sequence diagram illustrating an example of a process sequence which is performed by the monitoring system 1 when a monitoring service is provided. In the sequence diagram, communication between the user terminal 4 and the server 3 and communication between the server 3 and the vehicle 2 are performed via the communication network 6 and the radio base station 5. The processes in the server 3 are performed by the processor 34 of the server 3, and the processes in the vehicle 2 are performed by the ECU 40 of the vehicle 2.

When utilization of a monitoring service is requested, a user operates the user terminal 4 to input monitoring request information to the user terminal 4. Inputting of the monitoring request information is performed on a monitoring service application installed in the user terminal 4. When inputting of the monitoring request information is completed, the user terminal 4 transmits the monitoring request information to the server 3 (Step S1).

The monitoring request information includes a type of a monitoring object (such as a house, a tree, or a farmland), position information of the monitoring object, and a desired monitoring period. The position information of the monitoring object is input to the user terminal 4, for example, by designating a point on a map displayed on the user terminal 4. The monitoring request information may include a sample image of the monitoring object acquired by the user.

When the monitoring request information is transmitted from the user terminal 4 to the server 3, the payment unit 38 of the server 3 performs a payment process associated with the monitoring service (Step S2). That is, the payment unit 38 makes a charge for use of the monitoring service to the user. For example, the payment unit 38 pays the charge for use using an account transfer or a credit card payment based on user information which is registered in advance. After the payment process has been performed, the payment unit 38 transmits payment information including a bill to the user terminal 4 (Step S3). The payment process may be performed by the payment unit 38 after the desired monitoring period has ended.

Subsequently, the instruction unit 35 of the server 3 identifies the monitoring object based on the monitoring request information and selects a vehicle that performs monitoring (Step S4). When there is a plurality of vehicles 2 which is used for the monitoring service, that is, when the monitoring system 1 includes a plurality of vehicles 2, the instruction unit 35 selects a vehicle that performs monitoring out of the plurality of vehicles 2. For example, the instruction unit 35 selects a vehicle 2 in which the monitoring object is located on a travel route thereof as the vehicle that performs monitoring. Accordingly, it is possible to monitor the monitoring object without changing the travel route of the vehicle 2. A plurality of vehicles 2 may be selected as the vehicle that performs monitoring.

On the other hand, when a monitoring service is provided using only a specific vehicle 2, that is, when the monitoring system 1 includes one vehicle 2, the instruction unit 35 selects the specific vehicle 2 as the vehicle that performs monitoring. When the monitoring object is not located on the travel route of the vehicle 2, the monitoring object is monitored using the vehicle 2, for example, in a time period (for example, in the nighttime or in the early morning) in which the vehicle 2 is not transporting passengers. The passenger state detecting device 23 may detect whether there are passengers in the vehicle 2, and the monitoring object may be monitored when there are no passengers in the vehicle 2. When a user sets a monitoring object, only a local object on the travel route of the specific vehicle 2 may be able to be set as the monitoring object. In this case, it is possible to monitor a monitoring object without changing the travel route of the vehicle 2.

Subsequently, the instruction unit 35 instructs the vehicle 2 selected as the vehicle that performs monitoring to acquire appearance data of the monitoring object designated by the user. Specifically, the instruction unit 35 transmits a monitoring instruction to the vehicle 2 (Step S5). The monitoring instruction includes position information of the monitoring object (such as a position in the vicinity of the travel route or a direction of the monitoring object relative to the vehicle 2 at a nearby position), a monitoring period, and a device that is used for monitoring (at least one of the outside camera 211, the LiDAR 212, and the millimeter-wave radar 213 of the surrounding information detecting device 21).

When the monitoring instruction is transmitted from the server 3 to the vehicle 2, the vehicle 2 starts monitoring the monitoring object. Specifically, the ECU 40 of the vehicle 2 acquires appearance data of the monitoring object using the surrounding information detecting device 21 when the vehicle 2 passes through the vicinity of the monitoring object in the monitoring period at that time (Step S6).

When the appearance data is acquired by the outside camera 211, a captured image of the monitoring object is acquired as the appearance data. On the other hand, when the appearance data is acquired by the LiDAR 212 or the millimeter-wave radar 213, point group data of the monitoring object is acquired as the appearance data. The position information of the vehicle 2 detected by the GNSS receiver 24 or the like may be transmitted from the vehicle 2 to the server 3 and the appearance data of the monitoring object may be acquired by causing the instruction unit 35 of the server 3 to remotely control the surrounding information detecting device 21 of the vehicle 2.

After the appearance data of the monitoring object has been acquired, the ECU 40 of the vehicle 2 transmits the appearance data to the server 3 (Step S7). When the appearance data is transmitted from the vehicle 2 to the server 3, the monitoring result notifying unit 37 of the server 3 stores the appearance data in the storage device 32 or the memory 33 of the server 3 or a storage device outside the server 3 along with a date and time of reception of the appearance data or a date and time of acquisition of the appearance data. Then, the monitoring result notifying unit 37 determines whether to notify the user of the monitoring result and notifies the user of the monitoring result of the monitoring object according to necessity (Step S8).

Figure 7:
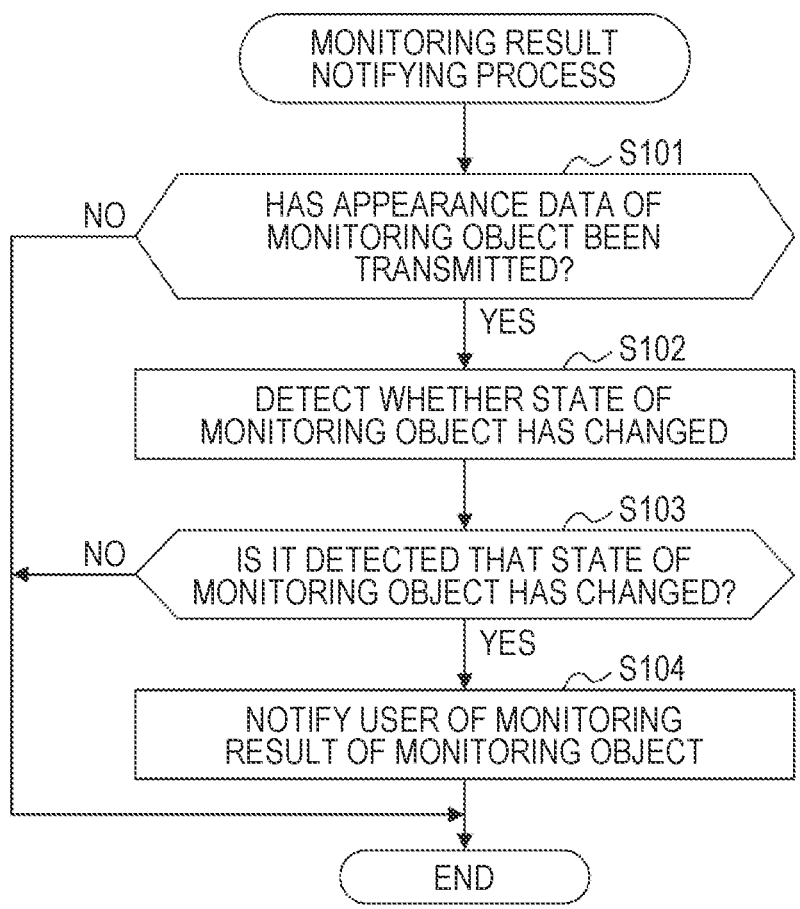
FIG. 7 is a flowchart illustrating a control routine of a monitoring result notifying process according to the first embodiment of the disclosure.

Whether to notify the user of the monitoring result is determined according to the flowchart illustrated in FIG. 7 based on the appearance data transmitted from the vehicle 2 to the server 3. FIG. 7 is a flowchart illustrating a control routine of a monitoring result notifying process according to the first embodiment of the disclosure. This control routine is repeatedly performed at predetermined execution intervals by the processor 34 of the server 3.

First, in Step S101, the detection unit 36 determines whether appearance data of a monitoring object has been transmitted from the vehicle 2 to the server 3. When it is determined that appearance data has not been transmitted, the control routine ends. On the other hand, when it is determined that appearance data has been transmitted, the control routine proceeds to Step S102.

In Step S102, the detection unit 36 analyzes the appearance data of the monitoring object and detects whether a state of the monitoring object has changed. For example, the detection unit 36 detects whether the state of the monitoring object has changed by comparing appearance data previously acquired by the vehicle 2 and appearance data currently acquired by the vehicle 2, that is, two pieces of appearance data in a time series intermittently acquired. In this case, the detection unit 36 calculates a rate of change of the appearance data, for example, by extracting featured portions from the two pieces of appearance data (captured image or point group data) and comparing the shape, luminance, and the like of the featured portions. Then, the detection unit 36 determines that the state of the monitoring object has changed when the rate of change of the appearance data is equal to or greater than a predetermined value, and determines that the state of the monitoring object has not changed when the rate of change of the appearance data is less than the predetermined value.

The detection unit 36 may detect whether the state of the monitoring object has changed using a discriminator that has been trained in advance such that a degree of similarity between the two pieces of appearance data is calculated based on the two pieces of appearance data in a time series. In this case, the detection unit 36 determines that the state of the monitoring object has changed when the degree of similarity of the appearance data is less than a predetermined value, and determines that the state of the monitoring object has not changed when the degree of similarity of the appearance data is equal to or greater than the predetermined value. The detection unit 36 may detect whether the state of the monitoring object has changed using a discriminator that has been trained in advance such that whether the state of the monitoring object has changed is determined based on the two pieces of appearance data in a time series. An example of the discriminator that calculates the degree of similarity of the appearance data or outputs whether the state of the monitoring object has changed is a machine learning model such as a neural network (for example, a convolutional neural network (CNN)), a support vector machine, or a random forest.

Subsequently, in Step S103, the monitoring result notifying unit 37 determines whether a change in state of the monitoring object has been detected by the detection unit 36. In other words, the monitoring result notifying unit 37 determines whether a change in state of the monitoring object has been detected by the detection unit 36. When the monitoring object is a house, a change in state of the monitoring object is detected by the detection unit 36, for example, when appearance data represents that a glass window of the house has been broken. When the monitoring object is a tree, a change in state of the monitoring object is detected by the detection unit 36, for example, when appearance data represents that the tree has grown.

When it is determined in Step S103 that a change in state of the monitoring object has not been detected, the control routine ends. Accordingly, in this case, since there is low necessity for notifying the user of the monitoring result of the monitoring object, the monitoring result notifying unit 37 does not notify the user of the monitoring result of the monitoring object.

On the other hand, when it is determined in Step S103 that a change in state of the monitoring object has been detected, the control routine proceeds to Step S104. In Step S104, the monitoring result notifying unit 37 notifies the user of the monitoring result of the monitoring object via the user terminal 4. For example, the monitoring result notifying unit 37 notifies the user that the state of the monitoring object has changed. Instead of or in addition to such notification, the monitoring result notifying unit 37 may notify the user of the monitoring result by transmitting a captured image of the monitoring object to the user via the user terminal 4. Accordingly, the user can ascertain an actual state of the monitoring object based on the captured image. On the other hand, when a captured image is not transmitted to the user at the time of transmitting the monitoring result to the user, it is possible to decrease an amount of data transmitted from the server 3 to the user terminal 4 and to reduce a communication load. The control routine ends after Step S104.

The detection unit 36 may detect whether there is an abnormality of the monitoring object as whether the state of the monitoring object has changed. That is, in Step S102, the detection unit 36 may detect whether there is an abnormality of the monitoring object by analyzing the appearance data of the monitoring object. For example, the detection unit 36 detects whether there is an abnormality of the monitoring object using a discriminator that has been trained in advance such that whether there is an abnormality of the monitoring object is determined based on the appearance data. An example of the discriminator that determines whether there is an abnormality of the monitoring object is a machine learning model such as a neural network (for example, a convolutional neural network (CNN), an automatic encoder, or a generative adversarial network (GAN)), a support vector machine, or a random forest.

In a modified example in which whether there is an abnormality of the monitoring object is detected, the monitoring result notifying unit 37 notifies the user of the monitoring result of the monitoring object when an abnormality of the monitoring object has been detected by the detection unit 36. Accordingly, since the user is notified of the monitoring result only when there is a high likelihood that an abnormality has occurred in the monitoring object, it is possible to further enhance convenience for the user.

For example, the monitoring result notifying unit 37 notifies the user that an abnormality has occurred in the monitoring object when an abnormality of the monitoring object has been detected by the detection unit 36. Instead of or in addition to such notification, the monitoring result notifying unit 37 may notify the user of the monitoring result by transmitting a captured image of the monitoring object to the user via the user terminal 4.

Only a captured image of the monitoring object may be acquired as the appearance data of the monitoring object. On the other hand, when a captured image of the monitoring object is not transmitted as the monitoring result, only point group data of the monitoring object may be acquired as appearance data of the monitoring object.

Second Embodiment

A monitoring system and a monitoring device according to a second embodiment basically have the same configuration and control as the monitoring system and the monitoring device according to the first embodiment except the following description. Accordingly, the second embodiment of the disclosure will be described below with a focus on a difference from the first embodiment.

In the second embodiment, a captured image of a monitoring object is acquired as appearance data of the monitoring object. That is, the ECU 40 of the vehicle 2 acquires the appearance data of the monitoring object using the outside camera 211 of the surrounding information detecting device 21.

As described above, when a change in state of the monitoring object has detected, the monitoring result notifying unit 37 notifies a user of the monitoring result of the monitoring object. However, it is conceivable that the user voluntarily want to acquire the captured image of the monitoring object even when a change in state of the monitoring object has not been detected. In some embodiments, when a disaster occurs in an area in which the monitoring object is situated, a captured image of the monitoring object may be transmitted to the user for the purpose of ascertainment of the state of the monitoring object.

Therefore, in the second embodiment, the monitoring result notifying unit 37 notifies the user of a captured image of the monitoring object according to the user's request. Accordingly, it is possible to reduce the user's uneasiness due to not notifying of the monitoring result and thus to enhance the user's satisfaction. When disaster information of the area in which the monitoring object is situated has been acquired, the monitoring result notifying unit 37 transmits a captured image of the monitoring object to the user. Accordingly, the user can quickly ascertain the state of the monitoring object when a disaster occurs.

Figure 8:
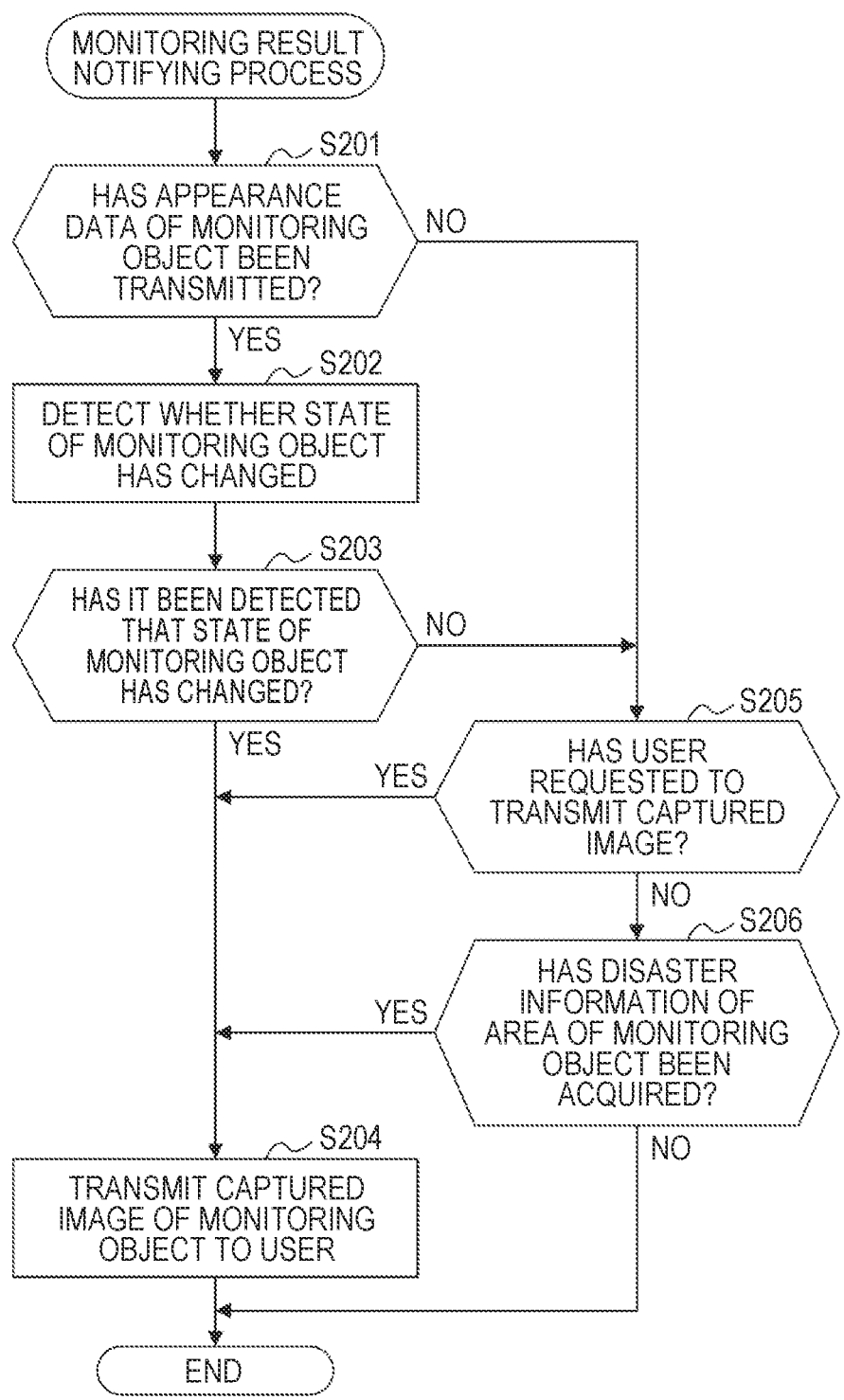
FIG. 8 is a flowchart illustrating a control routine of a monitoring result notifying process according to a second embodiment of the disclosure.

FIG. 8 is a flowchart illustrating a control routine of a monitoring result notifying process according to the second embodiment of the disclosure. This control routine is repeatedly performed at predetermined execution intervals by the processor 34 of the server 3.

First, in Step S201, similarly to Step S101 in FIG. 7, the detection unit 36 determines whether appearance data of a monitoring object has been transmitted from the vehicle 2 to the server 3. When it is determined that appearance data has been transmitted, the control routine proceeds to Step S202.

In Step S202, similarly to Step S102 in FIG. 7, the detection unit 36 detects whether a state of the monitoring object has changed by analyzing the appearance data of the monitoring object.

Subsequently, in Step S203, similarly to Step S103 in FIG. 7, the monitoring result notifying unit 37 determines whether a change in state of the monitoring object has been detected by the detection unit 36. When it is determined that a change in state of the monitoring object has been detected, the control routine proceeds to Step S204.

In Step S204, the monitoring result notifying unit 37 transmits a captured image of the monitoring object to the user via the user terminal 4. When Step S204 is performed after Step S203, the monitoring result notifying unit 37 may notify the user that the state of the monitoring object has changed instead of transmitting the captured image. After Step S204, the control routine ends.

On the other hand, when it is determined in Step S201 that appearance data of the monitoring object has not been transmitted or when it is determined in Step S203 that a change in state of the monitoring object has not been detected, the control routine proceeds to Step S205. In Step S205, the monitoring result notifying unit 37 determines whether the user has requested transmission of a captured image of the monitoring object. For example, the user requests acquisition of a captured image of the monitoring object by operating the user terminal 4, and the user terminal 4 transmits a request for transmission of a captured image to the server 3. In this case, the monitoring result notifying unit 37 determines that the user has requested transmission of a captured image of the monitoring object when the request for transmission has been transmitted from the user terminal 4 to the server 3.

When it is determined in Step S205 that the user has not requested transmission of a captured image of the monitoring object, the control routine proceeds to Step S206. In Step S206, the monitoring result notifying unit 37 determines whether disaster information of an area in which the monitoring object is situated has been acquired. The disaster information includes information on a natural disaster (such as an earthquake, a typhoon, a volcanic eruption, or a flood) and an accident (such as a power failure due to an operational error). For example, the monitoring result notifying unit 37 acquires disaster information by receiving the disaster information from the outside (such as a public agency (such as a meteorological agency or the Ministry of Land, Infrastructure, Transport, and Tourism) or a power company) of the server 3. The disaster information may be input to the server 3 by an operator of the server 3 or the like.

When it is determined in Step S206 that disaster information has not been acquired, the control routine ends. In this case, since there is low necessity for transmission of a captured image of the monitoring object to the user, the monitoring result notifying unit 37 does not transmit a captured image of the monitoring object to the user.

On the other hand, when it is determined in Step S205 that the user has requested transmission of a captured image or when it is determined in Step S206 that disaster information has been acquired, the control routine proceeds to Step S204.

In Step S204, the monitoring result notifying unit 37 transmits a captured image of the monitoring object to the user via the user terminal 4. In this case, the monitoring result notifying unit 37 transmits a newest captured image stored in the storage device 32 or the memory 33 of the server 3 or the like to the user. When disaster information has been acquired, the monitoring result notifying unit 37 may notify the user that a disaster has occurred in the area in which the monitoring object is situated via the user terminal 4 in addition to the captured image. When disaster information has been acquired, the monitoring result notifying unit 37 may transmit a captured image of the monitoring object to the user when the captured image of the monitoring object is transmitted from the vehicle 2 to the server 3 at that time until a resolution of the disaster is notified. After Step S204, the control routine ends.

Third Embodiment

A monitoring system and a monitoring device according to a third embodiment basically have the same configuration and control as the monitoring system and the monitoring device according to the first embodiment except the following description. Accordingly, the third embodiment of the disclosure will be described below with a focus on a difference from the first embodiment.

As described above, the payment unit 38 of the server 3 performs a payment process for a monitoring service when the monitoring service is provided to a user. At this time, the payment unit 38 determines a charge for use of the monitoring service, that is, a charge for monitoring of the monitoring object.

When a regular-route bus of which a travel route is determined in advance is used as the vehicle 2 that performs monitoring and a monitoring object is situated on the travel route, the vehicle 2 can monitor the monitoring object while traveling along the travel route for transportation of passengers. On the other hand, when a monitoring object is not situated on the travel route, it is necessary to allocate a vehicle for monitoring the monitoring object.

Accordingly, in the third embodiment, when the monitoring object is not situated on the travel route of the vehicle 2, the payment unit 38 sets the charge for monitoring of the monitoring object to be higher than that when the monitoring object is situated on the travel route of the vehicle 2. Accordingly, it is possible to easily set a local object on the travel route as a monitoring object and to promote effective utilization of the vehicle 2.

FIG. 9 is a flowchart illustrating a control routine of a charge setting process according to the third embodiment of the disclosure. This control routine is repeatedly performed at predetermined execution intervals by the processor 34 of the server 3.

First, in Step S301, the payment unit 38 determines whether a user has requested use of the monitoring service. In this embodiment, when monitoring request information has been transmitted from the user terminal 4 to the server 3, the payment unit 38 determines that the user has requested use of the monitoring service. When it is determined in Step S301 that the user has not requested use of the monitoring service, the control routine ends.

On the other hand, when it is determined in Step S301 that the user has requested use of the monitoring service, the control routine proceeds to Step S302. In Step S302, the payment unit 38 determines whether the monitoring object designated by the user is situated on the travel route of the vehicle 2. For example, this determination is performed by comparing the position of the monitoring object with the travel route.

When it is determined in Step S302 that the monitoring object is situated on the travel route of the vehicle 2, the control routine proceeds to Step S303. In Step S303, the payment unit 38 demands a predetermined normal charge from the user based on a monitoring period or the like as a charge for use of the monitoring service. After Step S303, the control routine ends.

On the other hand, when it is determined in Step S302 that the monitoring object is not situated on the travel route of the vehicle 2, the control routine proceeds to Step S304. In Step S304, the payment unit 38 demands an extra charge, which is higher than the normal charge, from the user as the charge for use of the monitoring service. After Step S304, the control routine ends.

Other Embodiments

While exemplary embodiments of the disclosure have been described above, the disclosure is not limited to the embodiments and various corrections and modifications can be made thereon without departing from description of the appended claims. For example, the vehicle 2 which is used for the monitoring service may be an automated-driving vehicle (such as an on-demand bus that operates according to a user's request for use, an automated-driving taxi, or a dedicated automated-driving vehicle for a monitoring service) other than a regular-route bus or a vehicle that is manually driven by a driver (such as a regular-route bus, a taxi, or a dedicated vehicle for a monitoring service). When a monitoring service is provided without cost, the payment unit 38 of the server 3 may be omitted.

A computer program that causes a computer to realize the functions of the constituent units of the processor 34 of the server 3 may be provided in a state in which it is stored in a computer-readable recording medium. Examples of the computer-readable recording medium include a magnetic recording medium, an optical recording medium, and a semiconductor memory.

The aforementioned embodiments can be arbitrarily combined and realized. For example, the control routine illustrated in FIG. 9 according to the third embodiment may be performed in the second embodiment.

What is claimed is:

1. A monitoring device comprising:
a processor configured to:
   instruct a vehicle to acquire appearance data of a monitoring object designated by a user;
   receive the appearance data from the vehicle and to detect whether a state of the monitoring object has changed based on the appearance data;
   notify the user of a monitoring result of the monitoring object when the processor detects that the state of the monitoring object has changed; and
   determine a charge for monitoring the monitoring object,
wherein the vehicle is a regular-route bus of which a travel route is determined in advance, and wherein the processor is configured to set the charge for use to be higher when the monitoring object is not located on the travel route than when the monitoring object is located on the travel route.

2. The monitoring device according to claim 1, wherein the processor is configured to notify the user that the state of the monitoring object has changed when the processor detects that the state of the monitoring object has changed.

3. The monitoring device according to claim 1, wherein the processor is configured to detect whether the monitoring object has an abnormality based on the appearance data, and
wherein the processor is configured to notify the user of the monitoring result of the monitoring object when the processor detects that the monitoring object has an abnormality.

4. The monitoring device according to claim 3, wherein the monitoring result processor is configured to notify the user that an abnormality of the monitoring object has occurred when the processor detects that the monitoring object has an abnormality.

5. The monitoring device according to claim 1, wherein the appearance data of the monitoring object includes a captured image of the monitoring object.

6. The monitoring device according to claim 5, wherein the processor is configured to notify the user of the monitoring result by transmitting the captured image of the monitoring object to the user when the processor detects that the state of the monitoring object has changed.

7. The monitoring device according to claim 5, wherein the processor is configured to transmit the captured image of the monitoring object to the user in response to a request from the user.

8. The monitoring device according to claim 5, wherein the processor is configured to transmit the captured image of the monitoring object to the user when disaster information of an area in which the monitoring object is situated is acquired.

9. The monitoring device of claim 1, wherein the processor is further configured to:
detect a rate of change of the appearance data;
determine that the state of the monitoring object has changed when the rate of change of the appearance data is equal to or greater than a predetermined value; and
determine that the state of the monitoring object has not changed when the rate of change of the appearance data is less than the predetermined value.

10. A monitoring method comprising:
instructing a vehicle to acquire appearance data of a monitoring object designated by a user;
receiving the appearance data from the vehicle and detecting whether a state of the monitoring object has changed based on the appearance data;
notifying the user of a monitoring result of the monitoring object when it is detected that the state of the monitoring object has changed; and
determining a charge for monitoring the monitoring object,
wherein the vehicle is a regular-route bus of which a travel route is determined in advance, and
wherein the charge for use is set to be higher when the monitoring object is not located on the travel route than when the monitoring object is located on the travel route.

11. The monitoring method of claim 10, further comprising:
detecting a rate of change of the appearance data;
determining that the state of the monitoring object has changed when the rate of change of the appearance data is equal to or greater than a predetermined value; and
determining that the state of the monitoring object has not changed when the rate of change of the appearance data is less than the predetermined value.

12. A monitoring system comprising:
a vehicle; and
a server,
wherein the vehicle includes a surrounding information detecting device configured to detect surrounding information of the vehicle, and
wherein the server includes:
a processor configured to:
instruct the vehicle to acquire appearance data of a monitoring object designated by a user;
receive the appearance data from the vehicle and to detect whether a state of the monitoring object has changed based on the appearance data;
notify the user of a monitoring result of the monitoring object when the processor detects that the state of the monitoring object has changed; and
determine a charge for monitoring the monitoring object,
wherein the vehicle is a regular-route bus of which a travel route is determined in advance, and
wherein the processor is configured to set the charge for use to be higher when the monitoring object is not located on the travel route than when the monitoring object is located on the travel route.

13. The monitoring system of claim 12, wherein the processor is further configured to:
detect a rate of change of the appearance data;
determine that the state of the monitoring object has changed when the rate of change of the appearance data is equal to or greater than a predetermined value; and
determine that the state of the monitoring object has not changed when the rate of change of the appearance data is less than the predetermined value.

* * * * *